Patented June 24, 1941

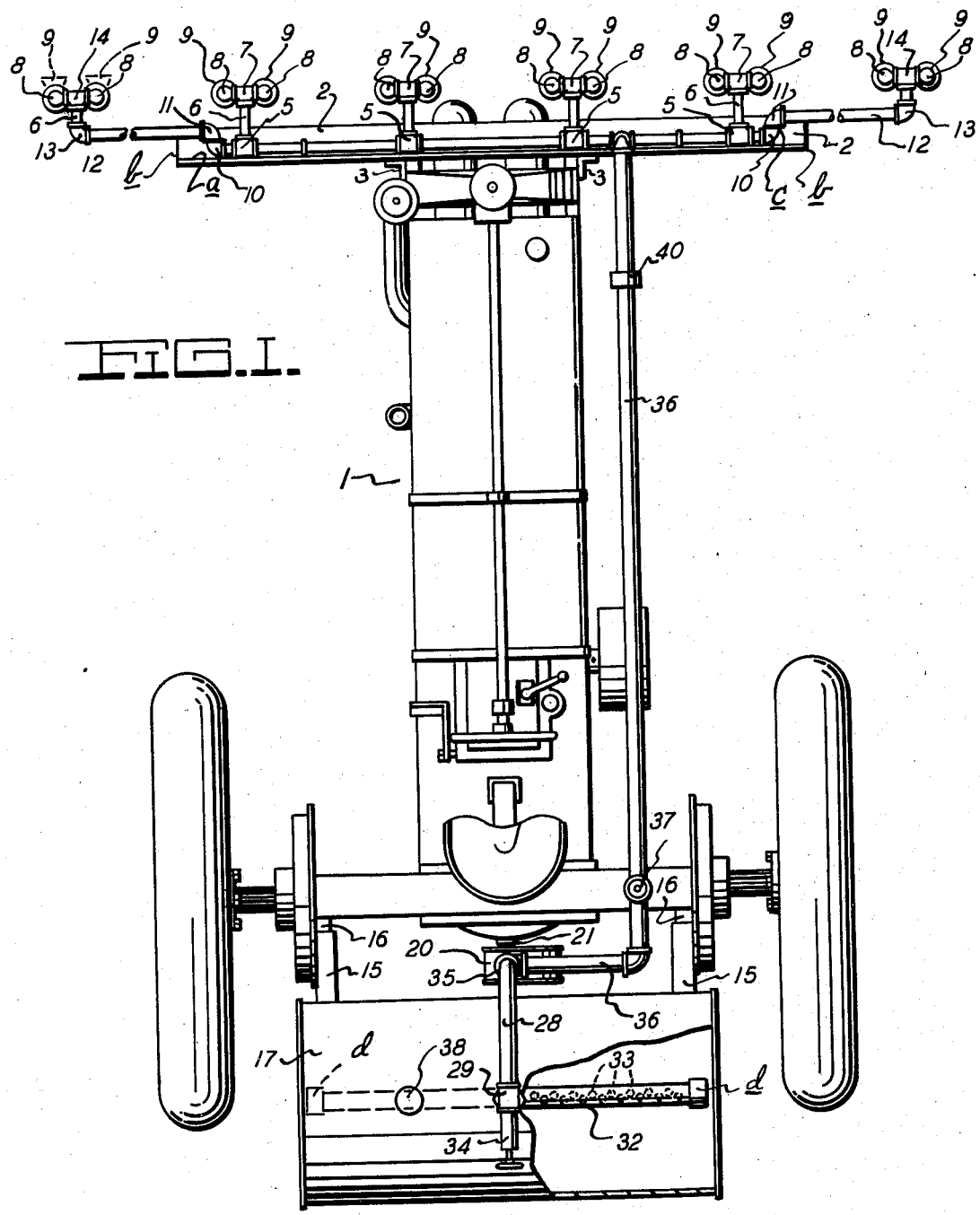

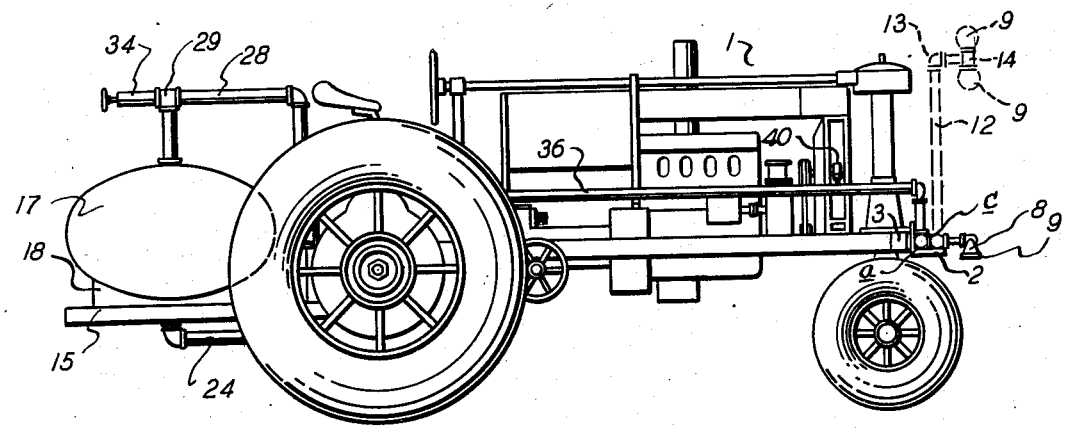
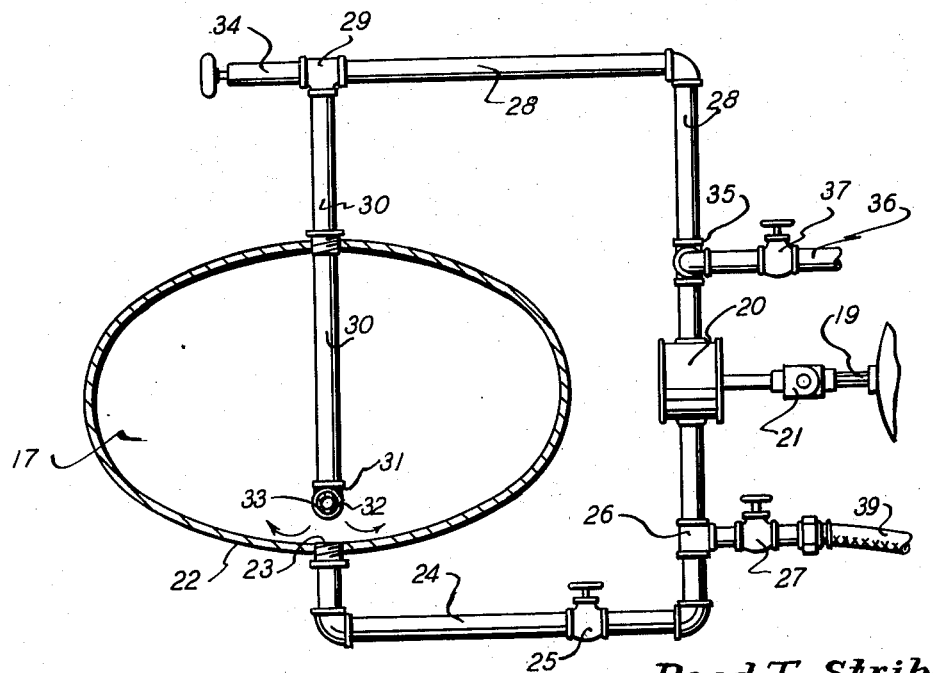
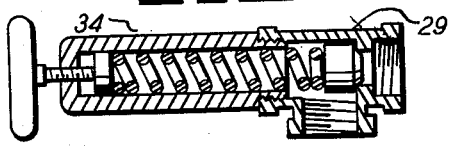

2,246,866

UNITED STATES PATENT OFFICE 2,246,866

SPRAYING APPARATUS FOR TRACTORS

Reed T. Stribling, Imperial, and Alton E. Simmons, Fort Stockton, Tex.

Application August 12, 1938, Serial No. 224,476

2 Claims. (Cl. 299—30)

This invention relates to spraying devices and has particular reference to an attachment for tractors and the like, and its primary object resides in the provision of an arrangement of elements whereby crops may be efficiently sprayed with liquid poison.

Another object of the invention is in the provision of a liquid spraying device that is capable of uniformly poisoning insects and plant disease.

A further object of the invention is in the provision of a device of this character in which pressure within the supply tank is eliminated.

Another object of the invention is to provide an agitator within the supply tank to prevent the settlement of precipitates commonly found in poisons used for this purpose by by-passing and returning a portion of the poison solution to the tank.

Broadly, the invention seeks to provide a spraying device for attachment with tractors and the like which is capable of spraying crops with liquid poison and in providing a liquid operated agitator.

In conventional type sprayers the poisons used are adapted to crops having considerable moisture thereon as found in low areas. The present invention is particularly adapted to the spraying of crops in arid and high altitudes where atmospheric moisture is lacking. As will be seen in the detailed description, the device creates a spray which simulates a liquid fog as the vehicle progresses in its operation.

With the foregoing objects as paramount, other and lesser objects will become manifest as the description proceeds taken in connection with the appended drawings wherein:

Figure 1 is a plan view of a tractor having the device attached thereto.

Figure 2 is an elevational view of the device illustrating the platform supporting the tank as well as showing the extensions of the nozzle pipes elevated in dotted lines.

Figure 3 is a cross-sectional view of the tank and an elevational view of the pump and the communications between the parts, and Figure 4 is a vertical sectional view of a relief valve employed in the invention.

Accordingly, the invention is comprised of a tractor 1 which has at its forward end a relatively large angle iron 2 laterally attached with brackets 3. Some makes of tractors are provided with apertures to receive bolts at the forward ends, and the angle iron 2 may, in such cases, be attached directly thereto. Within the angle a of the angle iron 2 there is positioned a pipe 4 which is divided in sections to receive a series of T-connections 5 so positioned as to receive nipples 6, the latter being designed to extend forwardly of the tractor 1. At the outer ends of the nipples 6 other T-joints 7 receive street-L's 8, which in turn secure adjustable spray nozzles 9. By this arrangement it can be seen that the nozzles can be adjusted vertically by positioning the street-L's 8 at different angles in the T's 7.

At the outer ends of the pipe 4 and within the ends $b$ of the angle iron 2, street-L's 10 threadedly connect elbows 11 which in turn receive extended portions of pipe 12, and by means of elbows 13 at the outer ends other T's 14 likewise receive street-L's 8 and adjustable nozzles 9. The arrangement of the street-L's 10 and the elbows 11 provides pivots $c$ whereby the extended pipe 12 and its accompanying parts may be elevated for decreasing the width of the apparatus when passing through gates or other narrow closures without the necessity of dismantling the device.

At the rear of the tractor 1 a platform 15 is secured to the draw bars 16 in the manner illustrated in Figure 1. In different makes of tractors the means of securing the platform may vary according to the provision made for rear attachments by various manufacturers. Upon the platform there is mounted an oval tank 17 which is held in place by cradles 18, as illustrated in Figure 2.

To the power take off 19 of the tractor 1, there is attached a pump 20; a universal joint 21 is positioned therebetween for the purpose of accommodating vibration and distortion which may be present in the operation of the machine.

The bottom 22 of the tank 17 is provided with an outlet 23 which is connected to the pump 20 by means of a communication 24. Within the communication 24 there is positioned a valve 25 and a T 26, the valve being closer to the opening 23 than the T 26. Connected to the T 26 there is another valve 27, the purpose of which will become manifest as the description proceeds.

Above the tank 17 another communication 28 extends from the pump 20 to a T 29 positioned directly above the said tank, thence a pipe 30 extends downwardly into the tank 17 and has at its lower end another T 31 which has laterally extending tubular members 32, the ends $d$ of which are closed. The tubular members 32 have angularly disposed orifices 33, the operation of which will presently be described.

Within the T 29 above the tank 17 there is positioned an adjustable relief valve 34 of the type illustrated in Figure 4 which acts against the force of the pump 20 but allows fluid to enter the pipe 30 and, at the same time, creating pressure within the communication 28.

Within the communication 28, between the tank 17 and the pump 20, a T 35 receives a connecting pipe 36. The latter extends to and joins the nozzle supporting pipe 4, and is provided with a regulating valve 37 positioned for convenient operation.

In operation, the poison is placed in the tank 17 through the tank opening 38. The valve 25 is then closed and the valve 27, which has a flexible hose 39 connected thereto, is opened. The pump 20 is then set in operation and, through the medium of the hose 39 and the communication 28, the tank 17 is filled with the desired amount of water. The valve 27 is then closed and the valve 25 opened. In spraying, the valve 37 of the connection 36 is adjusted to allow the desired amount of liquid to pass to the nozzles 9, the excess liquid passing through the communication 28 past the relief valve 34 and into the tank 17 and through the angular orifices 33 where it causes agitation of the poison solution within the tank 17.

The relief valve 34, previously referred to, causes the liquid to be transmitted through the connection 36 to the nozzles 9 where it is sprayed.

In order that the operator may determine the pressure at the nozzles 9, a pressure gage 40 is threaded into the communication 36 at a position where it may easily be read.

Manifestly, the structure shown is capable of considerable changes and modifications from time to time by those skilled in the art and such changes and modifications which may be resorted to falling within the intent of the invention may also be considered as falling within the scope of the appended claims.

What is claimed is:

1. In a spraying attachment for tractors including a tank and a pump and having an agitator for the contents of the said tank, a spray bar assembly comprising a discharge pipe extending from the said tank, a rigid spray pipe connected to the said discharge pipe and having spray nozzles arranged therealong, an angle bar horizontally arranged on the said tractor adapted to support the said spray pipe and extending beyond the ends thereof, extension pipes pivotally connected to the ends of the said spray pipe at such points removed from the ends of the said angle bar that each of the said extension pipes is horizontally supported thereby in both their extended and folded positions and spray nozzles connected to the outer ends of the said extension pipes.

2. In a spraying attachment for tractors including a tank and a pump and means providing for the agitation of the contents of the said tank by the said pump, a spray bar assembly comprising a discharge pipe, a rigid spray pipe connected to the said discharge pipe, an angle-iron connected transversely to the said tractor providing a support for the said spray pipe and extending beyond the ends thereof on each side of the said tractor, extension pipes pivotally connected to the ends of the said spray pipe, the pivotal connections being of such kind and being so located on the angle-iron support that each of the extensions is horizontally supported by the said angle-iron at a point removed from the pivotal connections in both their extended and folded positions and spray nozzles arranged along the said spray pipe and at the outer ends of the said extension pipes.

REED T. STRIBLING.
ALTON E. SIMMONS.